United States Patent
Smolik et al.

(10) Patent No.: US 6,501,736 B1
(45) Date of Patent: Dec. 31, 2002

(54) SYSTEM FOR INCREASING THE CALL CAPACITY OF A WIRELESS COMMUNICATION SYSTEM

(75) Inventors: Kenneth Frank Smolik, Naperville, IL (US); Shawn S. Yu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/272,130

(22) Filed: Mar. 19, 1999

(51) Int. Cl.[7] .......................... H04L 12/26; H04Q 7/00; H04B 7/216

(52) U.S. Cl. ................ 370/252; 370/332; 370/335; 455/13.4

(58) Field of Search ................................. 370/310, 335, 370/342, 328, 332, 320, 333, 252, 236, 232, 468, 441, 443; 455/67.1, 63, 563, 13.4; 375/225; 704/500

(56) References Cited

U.S. PATENT DOCUMENTS

| | | | | |
|---|---|---|---|---|
| 5,706,282 A | * | 1/1998 | Chung ........................ | 370/280 |
| 5,734,967 A | * | 3/1998 | Kotzin et al. ................ | 455/63 |
| 5,857,147 A | * | 1/1999 | Gardner et al. ............ | 455/67.1 |
| 6,049,537 A | * | 4/2000 | Proctor et al. .............. | 370/342 |

* cited by examiner

Primary Examiner—Alpus H. Hsu
Assistant Examiner—Duc Ho
(74) Attorney, Agent, or Firm—Patton Boggs, LLP

(57) ABSTRACT

The system for increasing the call capacity of a wireless communications system degrades voice quality of the communications connections within a predetermined limit in order to increase the efficiency of the available RF spectrum as measured by the call carrying capacity of this allocated RF spectrum. This is accomplished by adjusting the transmission rate of the speech coder at the mobile subscriber unit and/or the speech coder that may be located at the mobile switching center so that the call carrying capacity of the wireless communications system is therefore increased. Additionally, the situation of call blocking is monitored to determine if frame error rate targets should be adjusted to further increase the call capacity. At times when the wireless system is not experiencing peak usage, the voice quality is restored to normal levels. The term "mobile subscriber unit" does not imply that the mobile unit is restricted to a moving vehicle. The present state of the art includes the use of mobile subscriber units in fixed wireless applications as an alternative to traditional wire telephony services.

28 Claims, 5 Drawing Sheets

SYSTEM FOR INCREASING THE CALL CAPACITY OF A WIRELESS COMMUNICATION SYSTEM

FIELD OF INVENTION

This invention relates to wireless communications systems, such as a cellular mobile telecommunication system, that utilizes variable speech coders and, in particular, to a system for increasing the call capacity of CDMA channels that functions to determine the rate of call blockage and adjusts the transmission rate of the associated speech coders in existing wireless call connections to reduce the rate of call blockage and maintain quality of service in the cellular mobile telecommunication system.

Problem

It is a problem in the field of wireless communications systems reduce the rate of call blockage. With the explosive growth of service provided by Code Division Multiple Access (CDMA) systems, it is imperative that the available radio frequency (RF) spectrum be utilized in as efficient means as possible. CDMA technology is based upon presently available spread spectrum technology and is being adapted to support new services, such as third generation wireless communication. In a CDMA system, when the RF capacity is reached (as measured by the number of calls being supported) the service provider may be forced to add additional RF spectrum to service additional calls, if any additional RF spectrum is available. Moreover, the call traffic is controlled by an underlying stochastic process, and thus the call carrying capacity experiences peaks in usage. It is therefore desirable to have a mechanism that improves the call carrying capacity of existing RF spectrum, especially during times of peak usage.

One approach to decreasing interference within a cellular communication system is discussed in U.S. Pat. No. 5,734,967, issued to Kotzin et al., which uses the measured distance between the mobile subscriber unit and the serving base station to determine if the speech coder transmission rate should be reduced in order to reduce the associated interference level within the wireless system. This approach to controlling interference is restricted to using the measured distance criterion. It does not approach the problem from a total system point of view and does not provide a flexible means for a system provider to manage the call capacity of a wireless system.

Therefore, there is presently no system that can simply and effectively improve the call carrying capacity of existing RF spectrum in a CDMA system, especially during times of peak usage.

Solution

The above problem is solved and a technical advance achieved in the field of wireless communications systems by the present system for increasing the call capacity of CDMA channels. In this system, if call blocking is detected in the wireless communications system it may be acceptable to degrade voice quality of the communications connections within a predetermined limit in order to increase the efficiency of the available RF spectrum as measured by the call carrying capacity of this allocated RF spectrum. This is accomplished by adjusting the transmission rate of the speech coder at the mobile subscriber unit and/or the speech coder that may be located at the mobile switching center so that the call carrying capacity of the wireless communications system is therefore increased. Additionally, the situation of call blocking is monitored to determine if frame error rate targets should be adjusted to further increase the call capacity. At times when the wireless system is not experiencing peak usage, the voice quality is restored to normal levels.

The term "mobile subscriber unit" does not imply that the mobile unit is restricted to a moving vehicle. The present state of the art includes the use of mobile subscriber units in fixed wireless applications as an alternative to traditional wire telephony services.

The system for increasing the call capacity of CDMA channels has separate criteria and control for the reverse link and for the forward link of the CDMA channels. Separate control is desirable since the call carrying capacity may be different for the two directions and channel usage may be asymmetric. The later observation may result from data services that are offered in parallel with voice services. Data services often have the characteristic of being asymmetric, such as a file being downloaded into a personal computer. Criteria include, but are not limited to: total power, frame error rate and quality of service (QoS) associated with specific mobile subscriber units. Each mobile subscriber unit may be associated with an individual level of quality of service. For example, a wireless communication system may offer both "premium" service and "basic" service, with "premium" service providing better perceived voice quality to the mobile subscriber unit under peak call durations. The number of levels of QoS is not limited to two.

This system for increasing the call capacity of CDMA channels also offers the flexibility in that various degrees of speech coder rate reduction are supported to better match the varying conditions of traffic demands and the desired quality of service. Moreover, additional flexibility is provided in that the service provider can affect only calls that are being set up or all calls (calls being set up as well as calls after set up).

DETAILED DESCRIPTION

Figure 1:
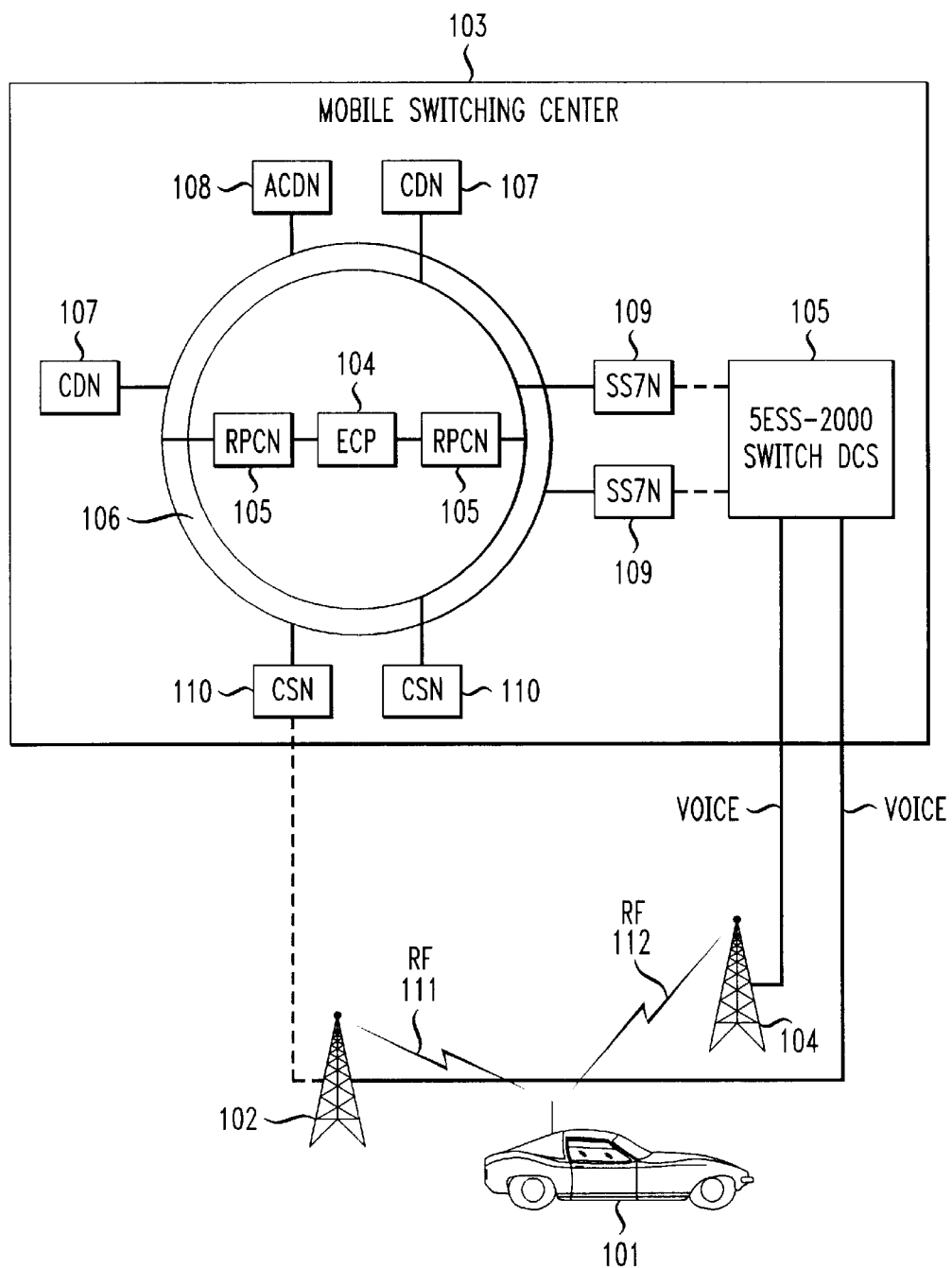
FIG. 1 illustrates the architecture of a wireless communications system.

Cellular mobile telecommunication systems represent one example of wireless communications systems and function to provide the service of connecting mobile telecommunications customers, each having a mobile subscriber unit, to both land-based customers who are served by the common carrier public telephone network as well as other mobile telecommunications customers. In such a system, all incoming and outgoing calls are routed through the mobile switching center (MSC), each of which is connected to a plurality of base stations which communicate with mobile subscriber units located in the area covered by the base stations. The mobile subscriber units are served by the base stations, each of which is located in one cell of a larger service region. Each base station in the service region is connected by a group of communication links to the mobile switching center, with the communication link being either direct or indirect through a controller that may span a plurality of base stations. A communication link transports user data, which may be a digital representation of voice, between the base station and the mobile switching center. Each base station contains a group of radio transmitters and receivers, with each transmitter-receiver pair being connected to one communication link. Each transmitter-receiver pair operates on a pair of radio frequencies: one frequency to transmit radio signals to the mobile subscriber unit and the other frequency to receive radio signals from the mobile subscriber unit. With CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a mobile subscriber unit is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The mobile communication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber units to the selected radio frequency.

Each cell in the ground-based cellular mobile telecommunication network comprises a predetermined volume of space radially arranged around the base station transmitting antenna with the region of space roughly approximating a cylindrical volume having a limited height. Since all of the mobile subscriber units are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a ground-based mobile subscriber unit initiates a call connection, control signals from the local base station transmitter cause the frequency agile transceiver in the ground-based mobile subscriber unit to operate at the frequency of operation and orthogonal coding designated for that particular base station. As the ground-based mobile subscriber unit moves from one base station to another, the call connection is handed off to the successive base stations and the frequency agile transceiver in the ground-based mobile subscriber unit adjusts its frequency of operation and/or orthogonal coding of the transmitter located at the base station in which the ground-based mobile subscriber unit is presently operational. Furthermore, with CDMA, it is possible that a mobile subscriber unit may be simultaneously communicating with a plurality of base stations. Such a configuration is commonly called a soft handoff and is preferable to handoffs in which a mobile subscriber unit is transferred from one base station to another. The latter type of handoff is commonly called a hard handoff. With a soft handoff, base stations are added or dropped from the plurality of base stations serving the mobile subscriber unit as the mobile subscriber unit traverses the serving area supported by the mobile switching center. However, all of the base stations in the plurality of base stations serving the mobile subscriber unit must communication with the given mobile subscriber unit on the same transmitter-receiver frequencies.

Wireless Communications System Architecture

FIG. 1 is the block diagram of the architecture of one example of an existing commercial wireless communications system. In the description of the disclosed invention, the major entitles are the mobile subscriber unit 101, base stations 102 and 104, and the mobile switching center 103. The mobile switching center 103 contains an executive control processor (ECP) 104 connected to a ring peripheral controller node (RPCN) 105, both of which are linked to a ring structure 106. The ring structure 106 provides a transport means for communicating among the entities within the mobile switching center 103. Also contained within the mobile switching center 103 are call processing/database nodes (CDN) 107 and an administrative call processing node (ACDN) 108. A major function of these entitles is the execution of call processing associated with the mobile switching center 103. The 5ESS-2000 Switch DCS 105 provides the telephone connectivity between base stations 102 and 104. The 5ESS-2000 Switch DCS is connected to the IMS/CNI Ring 106 through SS7 nodes (SS7N) 109. Base stations 102 and 104 are connected to the IMS/CNI Ring 106 through cell site nodes (CSN) 110. The mobile switching center 103 has additional functionality such as billing, administration, and maintenance, requiring additional entities. However, the corresponding description of these entities are not essential to the embodiment of the disclosed invention. Base stations 102 and 104 communicate with mobile subscriber unit 101 using RF channels 111 and 112, respectively. RF channels 111 and 112 convey both command messages as well as digital data, which may represent voice signals being articulated at the mobile subscriber unit 101 and the far-end party. With a CDMA system, the mobile subscriber unit communicates with at least one base station. In FIG. 1, the mobile subscriber unit is simultaneously communicating with two base stations, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the CSNs 110. Of course, a mobile subscriber unit 101 may communicate with only a single base station if determined as sufficient by the wireless communications system.

Speech Coder

In a CDMA system, several speech coder algorithms (types) may be supported. In the literature, the term vocoder is often used as a synonymous term for speech coder. Either the mobile subscriber unit or the mobile switching center can initiate a service negotiation procedure. This procedure is specified in Standards document TIA/EIA-95-A (Mobile Station-Base Station Compatibility Standard for Dual-Mode Spread Spectrum Systems). TIA is the acronym for the Telecommunications Association and EIA is the acronym for the Electronics Industry Association. The objective of this procedure is for the mobile switching center and the mobile subscriber unit to agree on a service option, which in this description, corresponds to the corresponding speech coder algorithm.

Presently, three speech coding algorithms are commonly used in the wireless industry. A basic characteristic of these speech coder algorithms is that the transmission rate can be varied; this is explained in greater detail. A second basic characteristic of these speech coder algorithms is that a digital representation of the speech input is transmitted in a packetized format every 20 msec or 50 times each second. The first speech coder algorithm is specified in Standards document EIA/TIA IS-96-B (Speech Service Option Standard for Wideband Spread Spectrum Systems). This algorithm supports a variable transmission rate having rates of 171 bits per packet (full rate), 80 bits per packet (half rate), 40 bits per packet (quarter rate), and 16 bits per packet (eighth rate). This speech coder has an associated service option of 1 and is called the 8K Speech Coder in this description. The second speech coder is being standardized but is currently licensed by QUALCOMM. This algorithm supports a variable transmission rate having rates of 266 bits per packet (full rate), 124 bits per packet (half rate), 54 bits per packet (quarter rate), and 20 bits per packet (eighth rate). The corresponding service option is 0x8000, and is called the 13K Speech Coder in this description. The third speech coder algorithm is specified in Standards document TIA/EIA IS-127 (Enhanced Variable Rate Codec, Speech Service Option 3 for Wideband Spread Spectrum Digital Systems). This algorithm supports a variable transmission rate having rates of 171 bits per packet (full rate), 80 bits per packet (half rate), and 16 bits per packet (eighth rate). This algorithm does not support the quarter rate. The corresponding service option is 3 and is called the EVRC coder in this description.

The variable rate is based upon the speech characteristics of the input to the speech coder. During voiced segments, the speech coder may form packets having full, half, or quarter rate; while during intervals not having voice activity (i.e. silence), the speech coder may form packets having eighth rate.

Speech Coder Rate Reduction

Without any intervening commands, the speech coder, using one of the heretofore mentioned three algorithms, generates different rate packets as determined by the characteristics of the inputted voice signal. In other words, there is an associated distribution of full rate, half rate, quarter rate, and eighth rate packets. This distribution determines the effective data rate of the resulting output of the speech coder. The three heretofore mentioned speech coding algorithm provide a provision in which a command may be issue to the speech coder, causing the distribution of different rate packets to be modified. In particular, such a command can reduce the number of full rate packets with respect to the number that have otherwise been generated. Such a command is called a Service Option Control Order, which has a field call the ORDQ field.

For the 8K Speech Coder, the following table shows the full rate reduction as a function of the ORDQ field:

| ORDQ (binary) | Fraction of Normally Full Rate Packets That Remain Full Rate | Fraction of Normally Full Rate Packets That Become Half Rate | Reduction Level |
|---|---|---|---|
| 000XXXXX | 1 | 0 | 0 |
| 001XXXXX | ¾ | ¼ | 1 |
| 010XXXXX | ½ | ½ | 2 |
| 011XXXXX | ¼ | ¾ | 3 |
| 100XXXXX | 0 | 1 | 4 |

In the above table, X denotes either a 0 bit or a 1 bit; the value is not relevant with respect of the corresponding results shown in the table.

For the 13K Speech Coder, the following table shows the full rate reduction as a function of the ORDQ field:

| ORDQ (binary) | Fraction of Normally Full Rate Packets That Remain Full Rate | Fraction of Normally Full Rate Packets That Become Half Rate | Fraction of Normally Full Rate Packets That Become Quarter Rate | Reduction Level |
|---|---|---|---|---|
| 000XXXXX | 1 | 0 | 0 | 0 |
| 001XXXXX | 7/10 | 3/10 | 0 | 1 |
| 010XXXXX | 7/10 | 0 | 3/10 | 2 |
| 011XXXXX | 4/10 | 3/10 | 3/10 | 3 |
| 10XXXXXX | 0 | 1 | 0 | 4 |

For the EVRC Speech Coder, the following table shows the full rate reduction as a function of the ORDQ field:

| ORDQ (binary) | Fraction of Normally Full Rate Packets That Remain Full Rate | Fraction of Normally Full Rate Packets That Become Half Rate | Reduction Level |
|---|---|---|---|
| 000XXXXX | 1 | 0 | 0 |
| 001XXXXX | ¾ | ¼ | 1 |
| 010XXXXX | ½ | ½ | 2 |
| 011XXXXX | ¼ | ¾ | 3 |
| 100XXXXX | 0 | 1 | 4 |

In each of the above three tables, the rows correspond to a rate reduction levels of 0, 1, 2, 3, and 4 corresponding to the first row to the fifth row, respectively.

Reducing the transmission rate of a speech coder, as illustrated in the above tables, affects the quality of the perceived voice quality by the user of the mobile subscriber unit and the far-end party. In the industry voice quality is typically measured by the mean opinion score (MOS), in which a MOS of 5 signifies excellent voice quality and a MOS of 1 signifies poor voice quality. A mean opinion score of 4 is typically gauged a toll quality. The following table shows the relationship between the level of speech coder reduction and the mean opinion score for a 13K speech coder (service option equal to 0X8000).

| Level of Speech Coder Reduction | Mean Opinion Score (MOS) | Capacity Gain |
| --- | --- | --- |
| 0 | 3.75 | 1.00 |
| 1 | not measured | not measured |
| 2 | 3.72 | 1.14 |
| 3 | 3.51 | 1.38 |
| 4 | 3.40 | 1.60 |

The capacity gain is relative to the radio capacity of a wireless system having no speech coder rate reduction. The above data suggests a capacity gain as large as 60% with degradation of voice quality. A capacity gain of 14% has a relatively small degree of voice quality.

For a given call, there is an associated speech coder at the mobile subscriber unit and another associated speech coder at either the base station or the mobile switching center.

Call Scenario for Speech Coder Reduction

Figure 2:
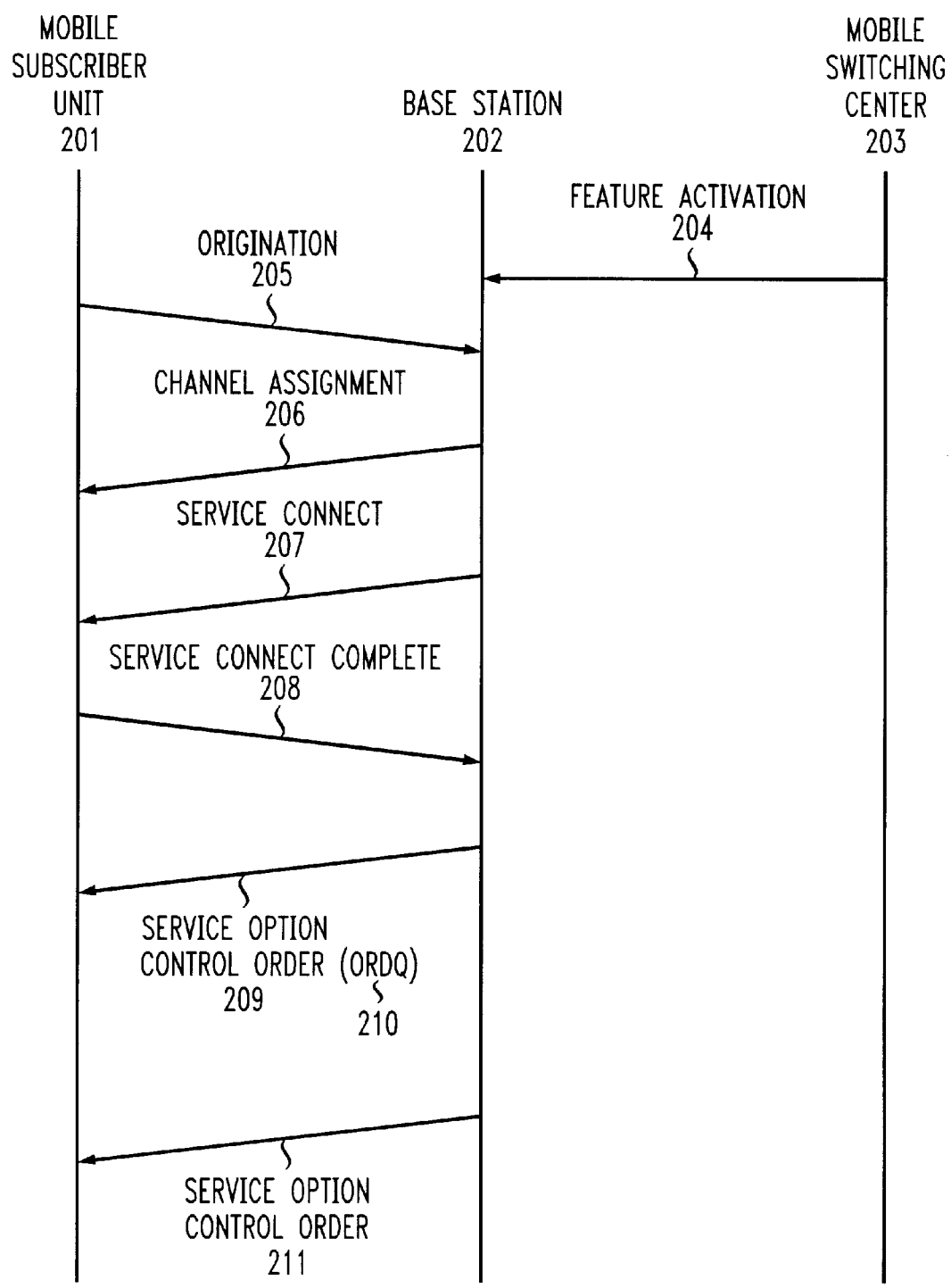
FIG. 2 illustrates the message flow in a wireless communications system between a base station and a mobile subscriber unit in order to reduce the speech coder rate for the speech coder at the mobile subscriber unit.

FIG. 2 illustrates the message flow between mobile subscriber unit 201 and base station 202 in order to support the speech coder rate reduction subprocess. FIG. 2 does not show the complete messaging between base station 202 and mobile switching center 203 since such detail is not required for understanding this disclosure. Mobile subscriber unit 201 corresponds to mobile subscriber unit 101 (FIG. 1); base station 202 corresponds to base station 102 (FIG. 1); mobile switching center 203 corresponds to mobile switching center 103 (FIG. 1). Communication between mobile subscriber unit 201 and base station 202 is conveyed over a RF channel corresponding to RF channel 111 (FIG. 1). In order to support a wireless call, mobile switching center 203 verifies the validity of dialed digits, verifies the validity of the subscriber, assigns network facilities, and optionally assigns a radio channel. Mobile switching center 203 issues messages to base station 202 indicative of the results of these functions. Initiated either by manual or automatic means, a feature activation message 204 is sent from the mobile switching center 203 to appropriate base stations 202 that are controlled by mobile switching center 203. Message 204 may be sent at the time of initiating the wireless system, which consists of mobile switching center 203 and base stations 202. Moreover, the speech coder rate reduction subprocess may be activated over all or a subset of the wireless system, i.e., a subset of the base stations. The time of initiating this subprocess is not correlated to occurrence of any particular call.

When mobile subscriber unit 201 wishes to initiate a mobile-originated call, mobile subscriber unit 201 sends an origination message 205 to the appropriate base station 202. In response, base station 202 replies with a channel assignment message 206, which assigns mobile subscriber unit 201 to a traffic channel. All messaging between mobile subscriber unit 201 and base station 202 occurs on an associated radio channel. Subsequently in the set up of the call, base station 202 sends a service connect message 207 to the mobile subscriber unit 201 in order to configure the traffic channel. Mobile subscriber unit 201 returns a service connect complete message 208 to base station 202 to acknowledge the completion of configuring the traffic channel. Base station 202 determines that the total power (over the plurality of mobile subscriber units being served at the time of setting up the given call) exceeds a threshold on the reverse link. This determination is a function of the speech coder rate reduction subprocess, which is described later in this disclosure. Consequently, base station 202 sends a service option control order message 209 to the mobile subscriber unit 201. (If the heretofore mentioned threshold is not exceeded, message 209 does not need to be sent.) Message 209 causes the mobile subscriber unit to adjust the transmission rate of its speech coder, according to the ORDQ field 210. At this point of time and thereafter, the call is considered as an established call; otherwise the call is not established. At a later point of time in the call, base station 202 may determine that the level of the speech coder reduction needs to be modified, resulting from a different measured total power on the reverse link. (The level corresponds to the levels in the heretofore mentioned tables relating the reduction level to the modified transmission rate.) This determination is again a function of the speech coder rate reduction subprocess. In such a case, base station 202 sends message 211 to the mobile subscriber unit 201.

Figure 3:
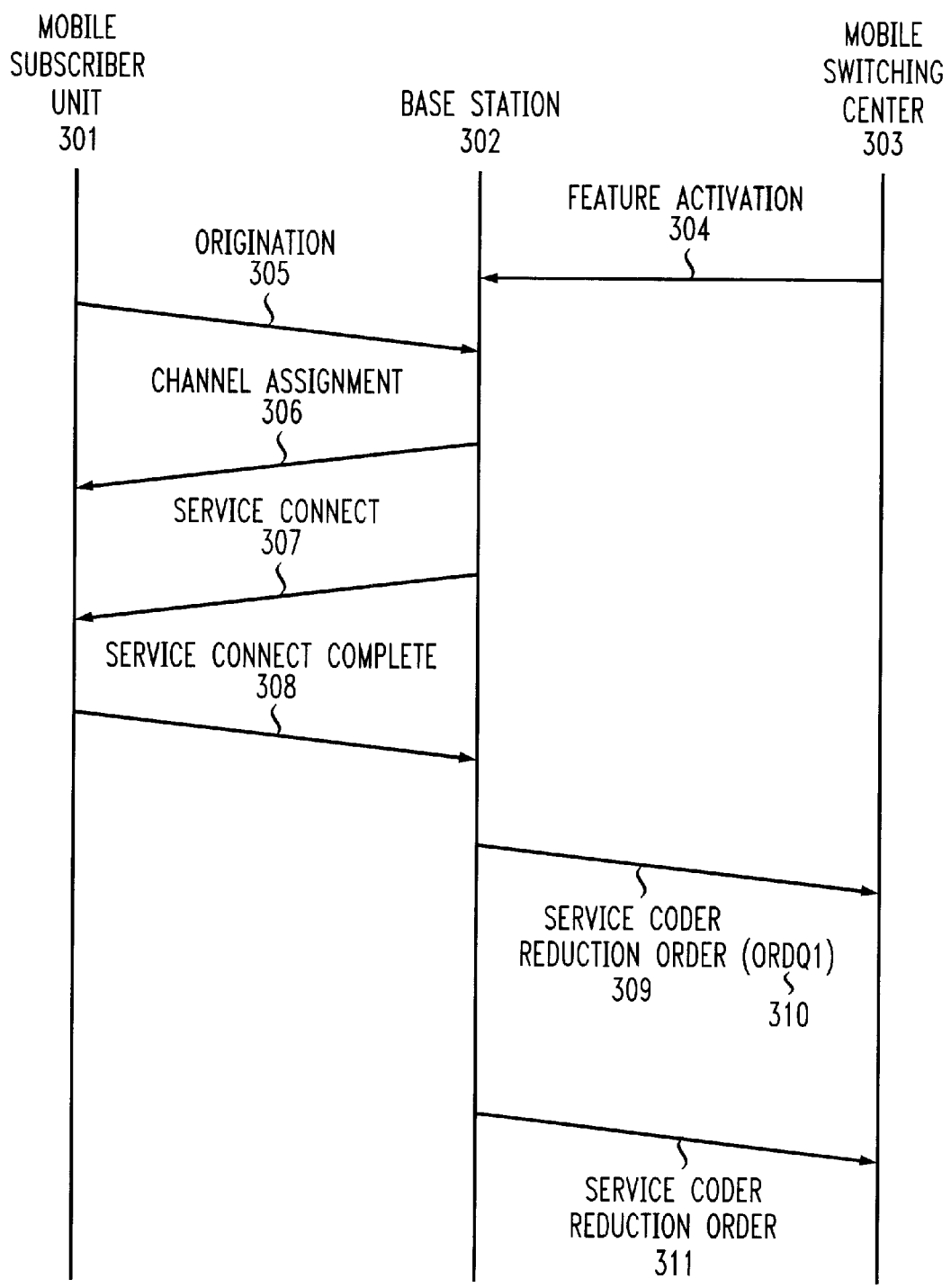
FIG. 3 illustrates the message flow in a wireless communications system between a base station and a mobile switching center in order to reduce the speech coder rate for the speech coder located at mobile switching center.

FIG. 3 is analogous to FIG. 2 except that the affected speech coder is located at the mobile switching center 303. Messages 304, 305, 306, 307, and 308 have the same function as messages 204, 205, 206, 207, and 208, respectively. However, previous to base station 302 sending a speech coder reduction order message 309 to the mobile switching center 303, base station 302 determines that the total power (over the plurality of mobile subscriber units being served at the time of setting up a call) exceeds a threshold on the forward link. This determination is a function of the speech coder reduction process. Message 309 contains the ORDQ1 field 310 that is substantially equivalent in scope as the ORDQ field 210 that is contained in message 209. However, the corresponding values may be different for the total power on the forward link and the total power on the reverse link. Message 309 is transported from base station 302 to mobile switching center 303 using terrestrial facilities such as a T1 facility. At a later time in the call, when the call is established, base station 302 may determine that the level of speech coder reduction needs to be modified, resulting from a different measured total power on the forward link. In such a case, base station 302 sends message 311 to the mobile switching center 303.

With the preferred embodiment, the speech coder is located at the mobile switching center 303; however, an alternative embodiment can situate the speech coder at base station 302. In such a case, messages 309 and 311 are not sent to mobile switching center 303 but are rather directed within base station 302.

FIG. 2 illustrates modifying the transmission rate of the speech coder at the mobile subscriber unit 201, while FIG. 3 illustrates modifying the transmission rate of the speech coder at the mobile switching center 303. However, in the preferred embodiment, both the total power on the reverse link and the total power on the forward link are evaluated independently. In other words, FIGS. 2 and 3 may be superimposed in time. Consequently, both messages 209 and 309 may be sent in the preferred embodiment. Even though entities 201 and 301 are logically separate, entities 201 and 301 are physically the same entity in the preferred embodiment. The same is true for entities 202 and 302 and for entities 203 and 303.

The message flows illustrated in FIGS. 2 and 3 are applicable to different speech coder algorithms having variable transmission rates. Examples include currently supported speech coder algorithms discussed heretofore.

Call Capacity Enhancement Process

Figure 4:
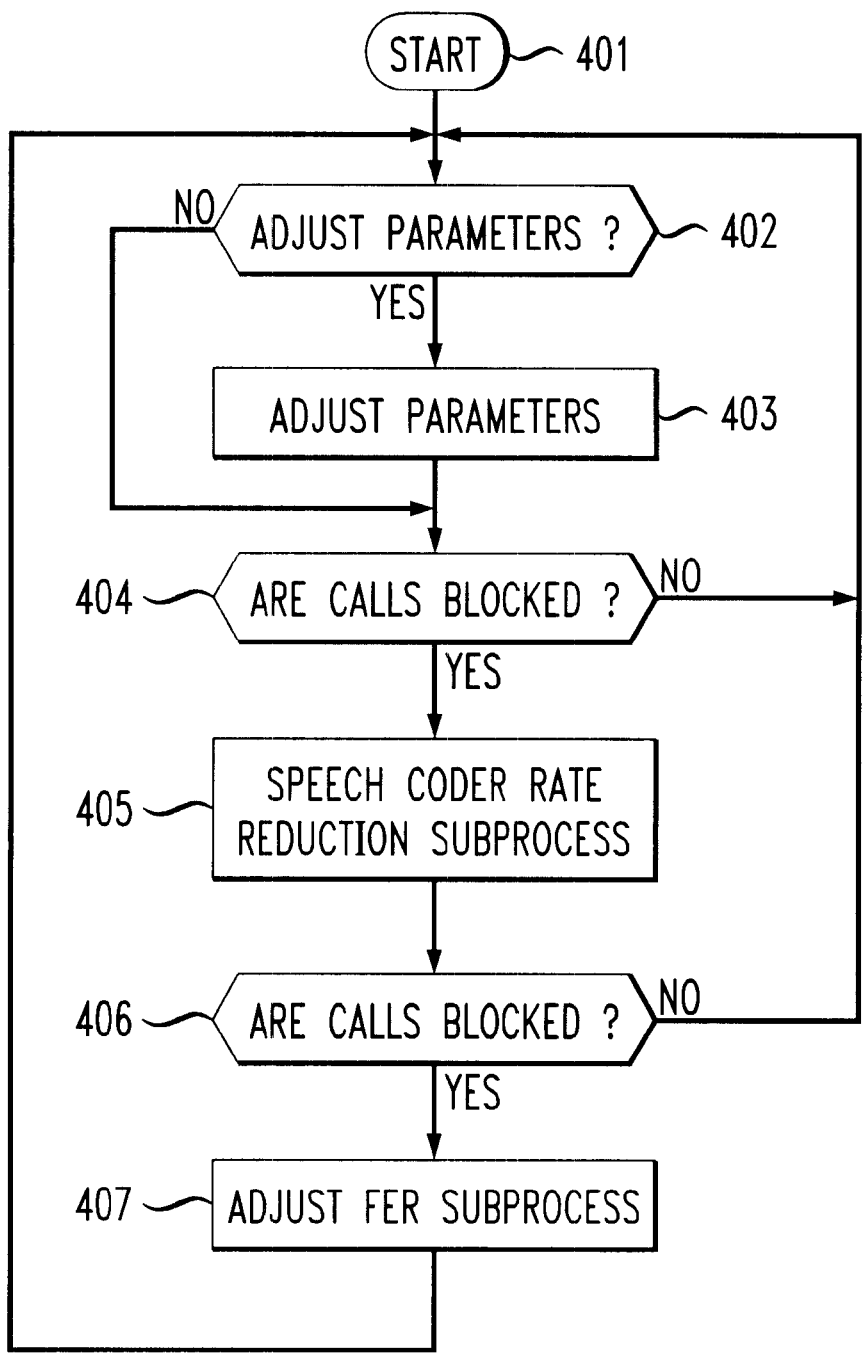
FIG. 4 illustrates in flow diagram form the operation of the call capacity enhancement process.

FIG. 4 illustrates the flow diagram for the call capacity enhancement process. Step 401 initiates the process, which is a consequence of messages 204 and 304 (FIGS. 2 and 3, respectively) being received at the selected base stations. Step 402 determines if any parameters need to be adjusted. These parameters is discussed later and are determined by the speech coder rate reduction subprocess 405 and the adjust FER subprocess 407. Initially, these parameters are not adjusted since additional steps (as is discussed hereafter) must be executed. With further iterations of this process, the appropriate parameters are adjusted. In step 403, the appropriate parameters are updated. Parameters associated with the mobile subscriber unit are contained in a service option control order message (FIG. 2); parameters associated with the mobile switching center are contained in a speech coder reduction order message (FIG. 3); parameters associated with the base station are directed within the base station. In step 404, the base station determines if calls are being blocked. Calls may be blocked for a number of call scenarios, including mobile-originated call attempts, mobile-terminated call attempts, and handoff attempts. For CDMA, call blocking is a condition in which additional calls will degrade current calls more than a predetermined level. In other words, call blocking is not "hard" but is "soft". In the preferred embodiment, this is determined by comparing the total power on the reverse link to an associated maximum allowable level and the total power on the forward link to an associated maximum allowable level, which may be different from the level associated with the reverse link. If either of the total power levels exceed corresponding limits, the call capacity enhancement process determines that calls are being blocked. If so, the speech coder rate reduction subprocess 405 is executed. Subprocess 405 is discussed in greater detail. The result of subprocess 405 is that values of parameters ORDQ and ORDQ1 may be modified. If so, the modified parameters is stored and is adjusted when step 403 is executed in the next iteration of the call capacity enhancement process. If calls are blocked, as determined by step 406, the adjust FER (frame error rate) subprocess 407 is executed. Step 406 is substantially equivalent to step 404. Subprocess 407 utilizes symbol error based power control as described in U.S. Pat. No. 5,727,033, issued to Weaver et al., the full text of which is incorporated herein by reference as if reproduced in full. The result of executing subprocess 407 is to determine if the $E_b/N_0$ target needs to be adjusted. If so, the modified parameter is stored and is adjusted when step 403 is executed in the next iteration of the call capacity enhancement process.

The service provider can choose a maximum level of QoS that is subjected to a service degradation as a result of the call capacity enhancement process. In this description, it is assumed that the greater the level of QoS, the better the service is provided. In other words, only those mobile subscriber units having a level of QoS less or equal to the maximum level of QoS will be affected by the call capacity enhancement process. Of course, the maximum level of QoS can be set so that all mobile subscriber units are affected by the process.

Speech Coder Rate Reduction Subprocess

Figure 5:
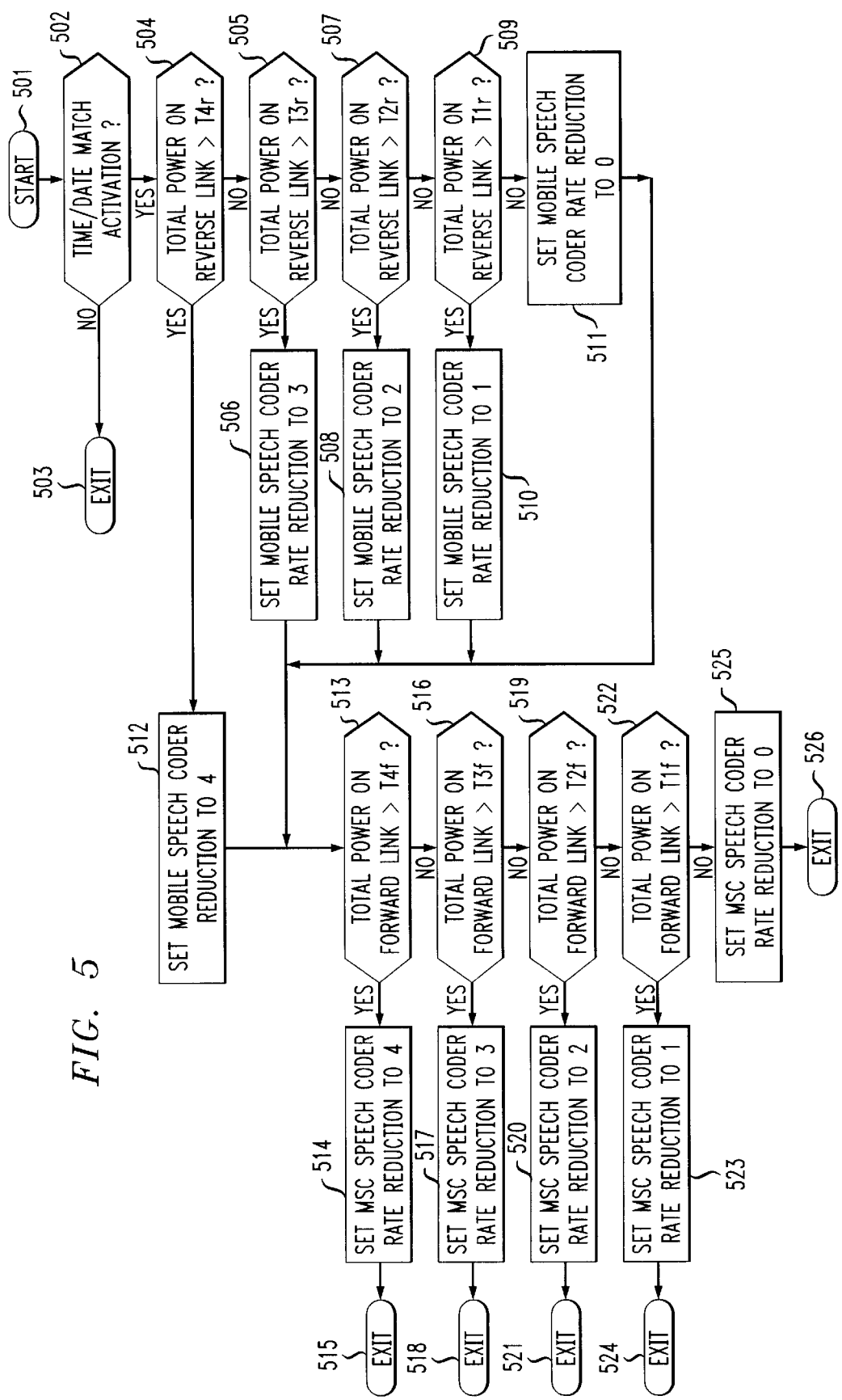
FIG. 5 illustrates in flow diagram form the operation of the speech coder reduction subprocess.

The speech coder rate reduction subprocess is illustrated as a flow diagram in FIG. 5. Step 501 initiates the subprocess at the base station. Step 502 determines if the subprocess is activated based upon the time and date. Activation can be initiated by message 204 in FIG. 2. If the subprocess is activated, step 504 determines if the total power on the reverse link exceeds a threshold T4r. Threshold values, as discussed in the context of this subprocess as disclosed as the preferred embodiment, are entered as data entries. It is assumed that the following relationships exist among these thresholds, namely T4r>T3r>T2r>T1r and T4f>T3f>T2f>T1f. If step 504 determines that the total power on the reverse link exceeds T4r, the mobile speech coders rate reduction parameter is set to 4 in step 512, and step 513 is executed in which the total power on the forward link is compared with threshold T4f. In step 504, if the total power on the reverse link is not greater than T4r, the total power on the reverse link is compared with threshold T3r. In step 505, if the total power on the reverse link is greater than T3r, the mobile speech coder rate reduction parameter is set to 3 in step 506 and step 513 is next executed. Otherwise, step 507 is executed in which the total power on the reverse link is compared to T2r. If greater, the mobile speech coder rate reduction parameter is set to 2 in step 508 and step 513 is executed. If not greater, the total power on the reverse link is compared to threshold T1r in step 509. If greater, the mobile speech coder rate reduction parameter is set to 1 in step 510 and step 513 in executed. If not greater, the mobile speech coder rate reduction parameter is set to 0 in step 511. In step 513, if the total power on the forward link is greater than T4f, then the MSC speech coder rate reduction parameter is set to 4 in step 514 and the subprocess is terminated in step 515. If not then the total power on the forward link is compared to threshold T3f in step 516. If greater, MSC speech coder rate reduction parameter is set to 3 in step 517. The subprocess consequently terminated in step 518. If not greater, the total power on the forward link is compared to T2f in step 519. If greater, then MSC speech coder rate reduction parameter is set to 2 in step 520 and the subprocess is terminated in step 521. If not, the total power on the forward link is compared to threshold T1f in step 522. If greater, MSC speech coder rate reduction parameter is set to 1 in step 523 and the subprocess is terminated in step 524. Otherwise, MSC speech coder rate reduction parameter is set to 0 in step 525 and the subprocess is terminated in step 526.

SUMMARY

Thus, a wireless communications system compares the total power on both the forward link and the reverse link with a set of thresholds as determined by the service provider either by manual or automated means. Consequently, the transmission rate of the speech coder at the mobile subscriber unit and of the speech coder at the mobile switching center as well as the target values for the frame error rate are adjusted accordingly. This adjustment enables a wireless communications system to increase its call capacity without additional spectrum.

What is claimed:

1. In a wireless communications system that provides wireless communication services to a plurality of wireless subscriber units extant in said wireless communication system, by utilizing a plurality of variable rate speech coders that have at least one adjustable operating parameter associated with a forward radio channel and having at least one adjustable operating parameter associated with a reverse radio channel, apparatus for minimizing a total power on at least one of said forward radio channel and said reverse radio channel, comprising:

means for determining an occurrence of call blockage, comprising:
    means for measuring a total power summed over all of said wireless subscriber units being served on said forward radio channel,
    means for comparing said total power on said forward radio channel to at least one threshold associated with said forward radio channel in order to determine if said total power on said forward radio channel is greater than at least one of said at least one threshold associated with said forward radio channel, means for measuring a total power summed over all wireless subscriber units being served on said reverse radio channel, means for comparing said total power on said reverse radio channel to at least one threshold associated with said reverse radio channel in order to determine if said total power on said reverse radio channel is greater than at least one of said at least one threshold associated with said reverse radio channel; and means, responsive to said occurrence of call blockage, for adjusting at least one of said at least one adjustable operating parameter associated with at least one of said forward channel and said reverse channel, whereby a resulting call carrying capacity of said wireless communications system is increased.

2. The wireless communications system in claim 1 further comprises:

means for identifying wireless subscriber units that are assigned a level of quality of service that Is less than a predetermined threshold; and wherein said means for adjusting is operable to adjust said at least one of said at least one adjustable operating parameter only for said identified wireless subscriber units.

3. The wireless communications system in claim 1 further comprising:

means, responsive to said occurrence of call blockage, for activating said means for adjusting for a portion of said wireless communications system.

4. The wireless communications system in claim 1 further comprising:

means, responsive to said occurrence of call blockage, for activating said means for adjusting according to time and date.

5. The wireless communications system in claim 1, wherein said means for adjusting said at least one of said at least one adjustable operating parameter associated with said forward radio channel comprises:

means for reducing a speech coder transmission rate according to said threshold associated with said forward radio channel that is exceeded by said total power summed over all of said wireless subscriber units being served on said forward radio channel.

6. The wireless communications system in claim 5, herein said means for adjusting at least one of said at least one adjustable operating parameter associated with said reverse radio channel comprises:

means for reducing a speech coder transmission rate according to said threshold associated with said reverse radio channel that is exceeded by said total power summed over all of said wireless subscriber units being served on said reverse radio channel.

7. The wireless communications system in claim 6, wherein said means for reducing said speech coder transmission rate pertains only for calls that are not established.

8. The wireless communications system in claim 6, wherein said means for reducing said speech coder transmission rate pertains to calls that are not established as well as calls that are established.

9. The wireless communications system in claim 6 further comprising:

means for determining call blockage after adjusting said speech coder reduction; and means for adjusting a transmission error rate.

10. The wireless communication system in claim 9 wherein said means for adjusting said transmission error rate pertains only to calls that are not established.

11. The wireless communications system in claim 9 wherein said means for adjusting said transmission error rate pertains to calls that are not established and calls that are established.

12. The wireless communications system in claim 9, wherein said means for adjusting said transmission error rate comprises:

means for adjusting a frame error rate.

13. The wireless communications system in claim 12, wherein said means for adjusting said frame error rate pertains only to calls that are not established.

14. The wireless communications system in claim 12, wherein said means for adjusting said frame error rate pertains to calls that are not established and to calls that are established.

15. In a wireless communications system that provides wireless communication services to a plurality of wireless subscriber units extant in said wireless communication system, by utilizing a plurality of variable rate speech coders that have at least one adjustable operating parameter associated with a forward radio channel and having at least one adjustable operating parameter associated with a reverse radio channel, a method for minimizing a total power on at least one of said forward radio channel and said reverse radio channel, comprising the steps of:

determining an occurrence of call blockage comprising:

measuring a total power summed over all said wireless subscriber units being served on said forward radio channel, comparing said total power on said forward radio channel to at least one threshold associated with said forward radio channel in order to determine if said total power on said forward radio channel is greater than at least one of said at least one threshold associated with said forward radio channel, measuring a total power summed over all said wireless subscriber units being served on said reverse radio channel, comparing said total power on said reverse radio channel to at least one threshold associated with said reverse radio channel in order to determine if said total power on said reverse radio channel is greater than at least one of said at least one threshold associated with said reverse radio channel; and adjusting, in response to said occurrence of call blockage, at least one of said at least one adjustable operating parameter associated with at least one of said forward channel and said reverse channel, whereby a resulting call capacity of said wireless communications system is increased.

16. The method for minimizing said total power of claim 15 further comprising the steps of:

identifying wireless subscriber units that are assigned a level of quality of service that is less than a predetermined threshold; and adjusting at least one of said at least one adjustable operating parameter only for said identified mobile subscriber units.

17. The method for minimizing said total power of claim 15 further comprising the step of:

activating, in response to said occurrence of call blockage, said step of adjusting in only a portion of said wireless communications system.

18. The method for minimizing said total power of claim 15 further comprising the step of:

activating, in response to said occurrence of call blockage, said step of adjusting according to time and date.

19. The method for minimizing said total power of claim 15, wherein said step of adjusting at least one of said at least one adjustable operating parameter associated with said forward radio channel further comprises:

reducing a speech coder transmission rate according to said threshold associated with said forward radio channel that is exceeded by said total power summed over all said wireless subscriber units being served on said forward radio channel.

20. The method for minimizing said total power of claim 15, wherein said step of adjusting at least one of said at least one adjustable operating parameter associated with said reverse radio channel further comprises:

reducing a speech coder transmission rate according to said threshold associated with said reverse radio channel that is exceeded by said total power summed over all said wireless subscriber units being served on said reverse radio channel.

21. The method for minimizing said total power of claim 20, wherein said step of reducing said speech coder transmission pertains only for calls that are not established.

22. The method for minimizing said total power of claim 20, wherein said step of reducing said speech coder transmission rate pertains to calls that are not established as well as for calls that are established.

23. The method for minimizing said total power of claim 20 further comprising the steps of:

determining call blockage after reducing said speech coder transmission rate; and adjusting a transmission error rate.

24. The method for minimizing said total power of claim 23, wherein said step adjusting said transmission error rate pertains only to calls that are not established.

25. The method for minimizing said total power of claim 23, wherein said step of adjusting said transmission error rate pertains to calls that are not established and calls that are established.

26. The method for minimizing said total power of claim 23, wherein said step of adjusting said transmission error rate comprises:

adjusting a frame error rate.

27. The method for minimizing said total power of claim 26, wherein said step of adjusting said frame error rate pertains only to calls that are not established.

28. The method for minimizing said total power of claim 26, wherein said step of adjusting said frame error rate pertains to calls that are not established and to calls that are established.

* * * * *